United States Patent [19]

Sapsford

[11] Patent Number: 5,568,728
[45] Date of Patent: Oct. 29, 1996

[54] FILAMENT COOLER

[75] Inventor: Gary S. Sapsford, Herts, United Kingdom

[73] Assignee: Northern Telecom Limited, Montreal, Canada

[21] Appl. No.: 388,151

[22] Filed: Feb. 13, 1995

[30] Foreign Application Priority Data

Mar. 5, 1994 [GB] United Kingdom ............... 9404290

[51] Int. Cl.$^6$ ........................... F25D 13/06; C03B 25/00
[52] U.S. Cl. ................... 62/63; 65/513; 65/434
[58] Field of Search ..................... 62/62, 63, 78; 65/510, 513, 434, 530, 532

[56] References Cited

U.S. PATENT DOCUMENTS

| | | | |
|---|---|---|---|
| 4,101,300 | 7/1978 | Imoto et al. | 65/530 X |
| 4,894,078 | 1/1990 | Takimoto et al. | 65/434 X |
| 4,913,715 | 4/1990 | Jochem | 65/434 |
| 4,966,615 | 10/1990 | Linden | 65/510 |
| 5,035,484 | 7/1991 | Ishiguro et al. | 350/96.30 |
| 5,160,359 | 11/1992 | Strackenbrock | 65/434 |

FOREIGN PATENT DOCUMENTS

| | | | |
|---|---|---|---|
| 0 174 699 | 3/1986 | European Pat. Off. . | |
| 0 261 856 | 3/1988 | European Pat. Off. . | |
| 0579388 | 1/1994 | European Pat. Off. | 65/434 |
| 3125857 | 11/1978 | Japan | 65/434 |
| 60-65747 | 4/1985 | Japan . | |
| 2 226 310 | 6/1990 | United Kingdom . | |

*Primary Examiner*—Christopher Kilner
*Attorney, Agent, or Firm*—Lee, Mann, Smith, McWilliams, Sweeney & Ohlson

[57] ABSTRACT

A filament cooler suitable for cooling freshly drawn optical fibre preparatory for being coated with a protective plastics coating has a water-cooled body member provided with a through hole opening out abruptly into a succession of spherical chambers in which a cyclonic gas flow is induced by the tangential injection of helium.

20 Claims, 5 Drawing Sheets

FILAMENT COOLER

BACKGROUND OF THE INVENTION

This invention relates to a filament cooler, particularly though not necessarily, a cooler for cooling an optical fibre freshly drawn from glass preform and requiring to be quickly cooled to a temperature suitable for the application thereto of a plastics protective coating. Such a cooler comprises a refrigerated jacket surrounding a portion of the fibre. The jacket is cooled by a flow of refrigerant through its walls, and this in turn cools the fibre through the agency of the thermal conductivity of a gaseous medium present between the fibre and in the inner wall of the refrigerated jacket.

In the case of cooling freshly drawn optical fibre, fast and efficient cooling is particularly desirable to enable the fibre to be capable of being drawn at high speed without having to have recourse to an excessively tall drawing tower or an inconveniently long cooler. Typically it is a requirement that the freshly drawn fibre be not allowed to come into contact with any surface before being provided with its protective coating. This means that the fibre can not be constrained to travel in a meander path through the cooler of greater length than that of the cooler, can not make multiple passes through the cooler, but must instead pass through it only once in a single straight line path. Having regard to the fact that the tension in the fibre over its unsupported length between the fibre drawing zone and the plastics coating applicator is determined by the required drawing conditions, it is evident that increasing this length in order to accommodate a longer cooler is going to have the effect of increasing the maximum amplitude of fibre vibration that is liable to occur over this length. This will mean that the clearance between the fibre and the surrounding inner wall of the jacket of the cooler will need to be greater in order to forestall the possibility of accidental contact, and this in turn means that cooling efficiency is reduced because the heat that has to be extracted from the fibre now has to be conveyed through the gas a greater distance from the fibre to the inner wall of the jacket.

Cooling efficiency is increased by the use of a lower temperature refrigerant, but generally there is a practical lower limit to the temperature of refrigerant that can be satisfactorily used, this being normally set by the need to operate at a temperature above the dew point in order to preclude problems associated with condensation on to surfaces of the cooler.

Cooling efficiency is also affected by the thermal conductivity of the gas present between the fibre and the inner well of the jacket of the cooler. Helium is especially effective in this respect, and has the additional advantage of being inert. On account of the cost of helium, a practical consideration in the design of an efficient cooler employing helium as coolant should preferably also take into account the avoidance of extravagant wastage of this gas.

A simple form of optical fibre cooler described in EP 0 174 699A comprises a jacketed pipe, held with its axis vertical, down through which the fibre is passed while helium gas is caused to flow upwardly by virtue of its natural buoyancy from an inlet point near the bottom end of the tube. An increase in cooling efficiency is obtained by reducing the bore of the pipe, thereby shortening the distance over which the heat has to be conducted from the fibre to the inner wall of the pipe. Under these circumstances the downward movement of the fibre, particularly if drawn at high speed, can produce a viscous drag overcoming the natural buoyancy of the helium, in which case the helium is introduced near the top of the tube, as for instance described in GB 2 226 310 A, rather than near the bottom.

The problem of obtaining increased cooling efficiency and reduced consumption of coolant are also addressed in U.S. Pat. No. 4,966,615 which discloses a water-jacketed pipe provided with a series of internal baffles which divide the interior into a set of communicating chambers. It is explained that the arrangement of baffles and chambers creates turbulence in the coolant gas flow where the flow enters a chamber after passing through one of the baffles, and that such turbulence improves cooling efficiency by breaking up the laminar flow of coolant gas surrounding the fibre. Cooling efficiency is also said to be improved by allowing additional cooling of the coolant gas in its passage through the baffles by allowing it to pass, not only through their central apertures that are threaded by the fibre, but also through additional apertures surrounding those central apertures.

SUMMARY OF THE INVENTION

The present invention is also directed to filament cooling using a multi-chamber cooler in which turbulent flow of the coolant gas is promoted, but in which cooling efficiency is further enhanced by arranging for there to be cyclonic flows of coolant gas within the chambers, which are preferably formed in the shape of substantially smooth cornerless solids of revolution so as to minimise the risk of the occurrence of regions therein of substantially stagnant coolant gas.

According to the present invention there is provided a filament cooler having a body member provided with at least one passage for the through flow of refrigerant, the body member having an axial through-hole for the axial passage therethrough of a filament to be cooled, said hole opening within the body member abruptly into each of a succession of cyclonic flow chambers each provided with at least one associated tangential flow orifice communicating with gas flow ducting, said orifice being oriented with respect to its associated chamber such that flow of gas through the orifice excites cyclonic flow of gas within said associated chamber.

The invention also provides a method of cooling a filament, in which method the filament is passed longitudinally vertically downwardly through an encircling refrigerated body member in which body member the filament passes in succession through a series of chambers in each of which a cyclonic flow of gas is maintained for the extraction of heat from the filament to the body member.

Preferably the rotational sense of the cyclonic flow in at least one of the chambers is the opposite of that in at least one other of the chambers, and a particularly preferred example of such an arrangement is the one in which the rotational sense is the same in alternate chambers.

BRIEF DESCRIPTION OF THE DRAWINGS

There follows a description of optical fibre drawing and protective coating apparatus incorporating a filament cooler embodying the invention in a preferred form. The description refers to the accompanying drawings, in which.

DETAILED DESCRIPTION OF A PREFERRED EMBODIMENT

Figure 1:
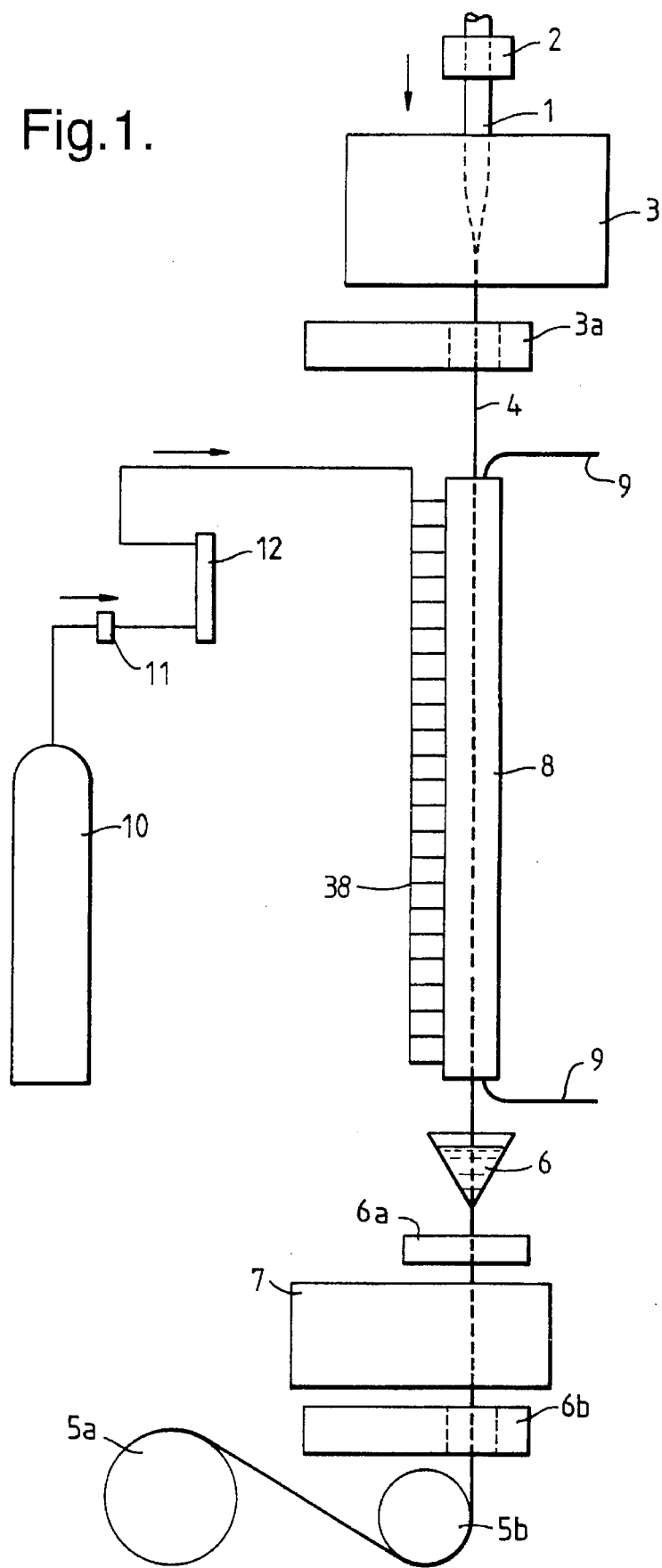
FIG. 1 is a schematic diagram of the apparatus

Referring to FIG. 1, an optical fibre preform 1 is held vertically in a mount 2 which lowers it axially at a controlled rate into a furnace 3. From the lower heat-softened tip of the preform 1 is vertically drawn an optical fibre 4 which is taken up on a winding drum 5a after passing around a capstan wheel 5b. Prior to coming into contact with any solid surface, the freshly drawn optical fibre is provided with a plastics protective coating in a coating applicator 6, this coating being cured in an oven 7. Prior to entering the coating applicator 6, the freshly drawn optical fibre is passed through a cooler 8. The cooler 8 is chilled by water flow through lines 9, and heat is extracted from the fibre to the inner walls of the cooler 8 by helium gas supplied from a cylinder 10 via a filter 11 and flowmeter 12. Monitoring of the fibre drawing, and of the coating application, is provided by a fibre diameter monitor 3a, a coating concentricity monitor 6a, and a coating diameter monitor 6b.

Figure 2:
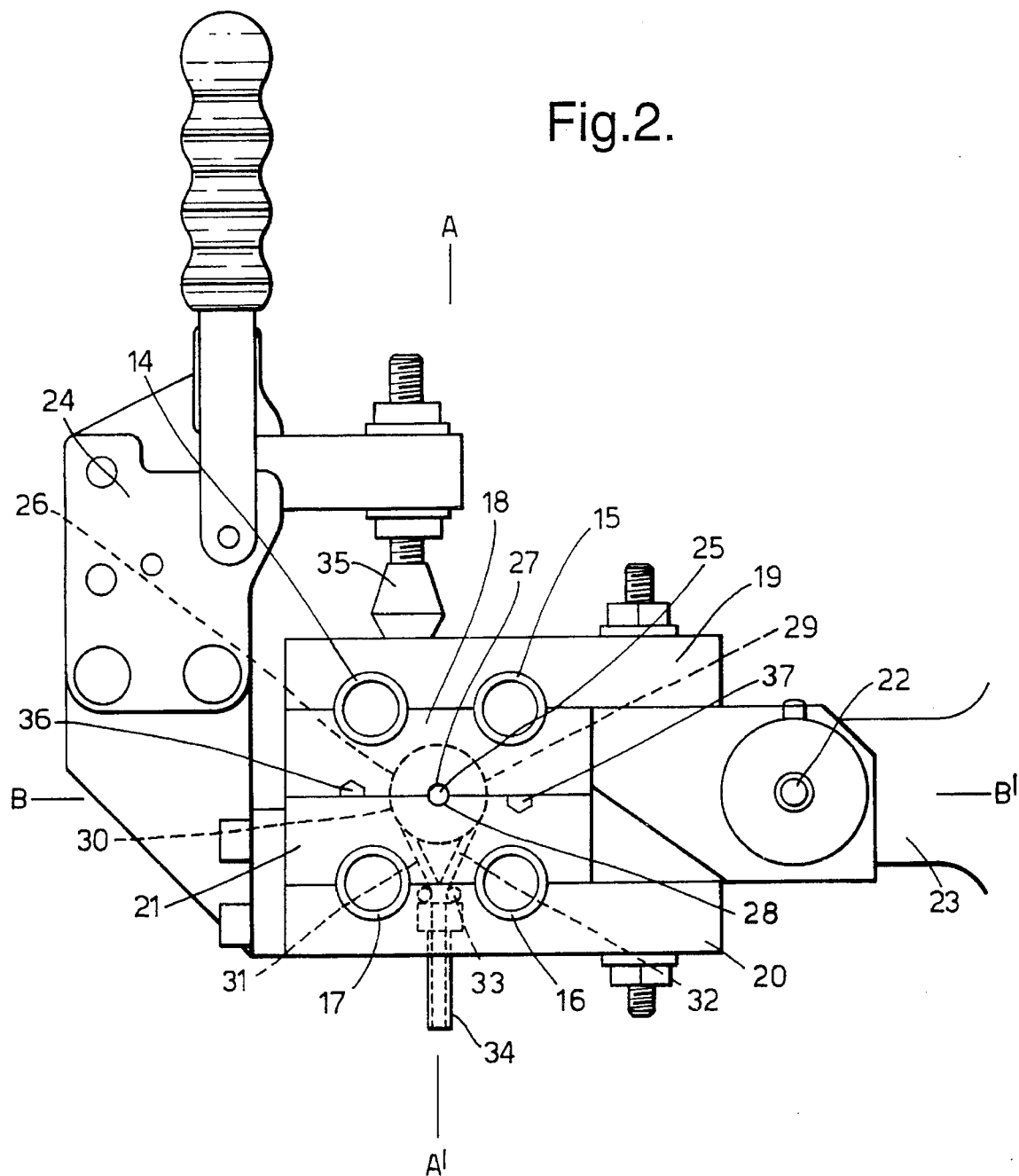
FIG. 2 is a plan view of the fibre cooling of the apparatus of FIG. 1, FIGS. 3 and 4 are vertical sectioned views of the cooler on the lines A–A' and B–B' in FIG. 2.
Figure 3:
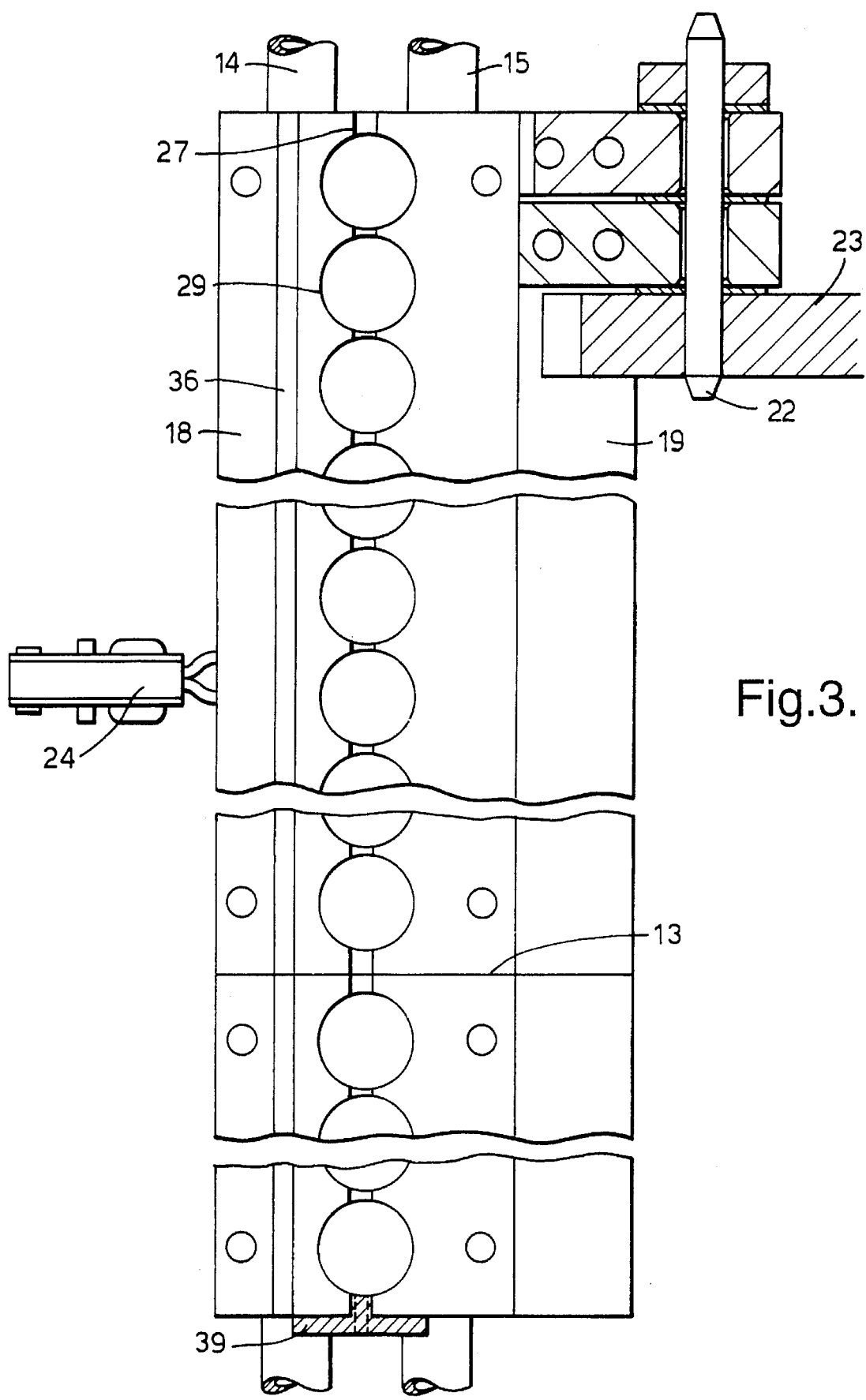
Figure 4:
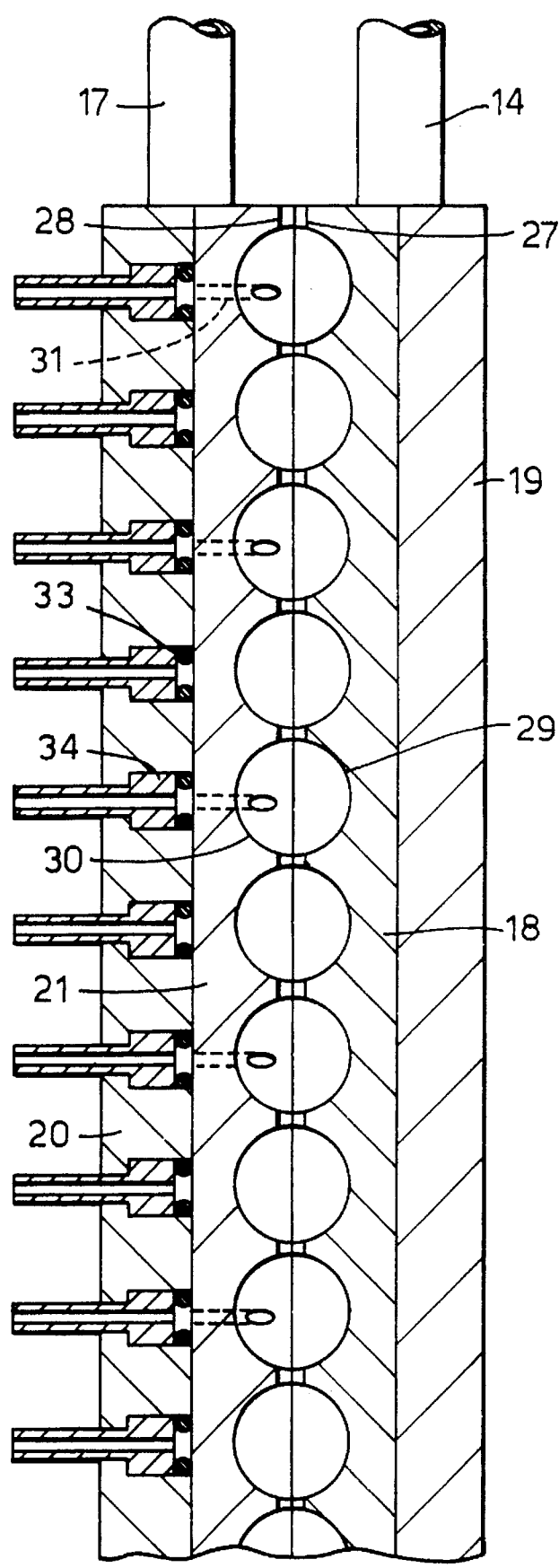

Turning attention now to FIGS. 2, 3 and 4, the main body of the cooler is constructed in sections which may typically each be approximately 0.5 meters high. A typical cooler may comprise three or four such sections mounted end to end. (A join between a pair of such sections is represented at 13 in FIG. 3). Running the full height of the cooler are four 10 mm diameter copper pipes 14, 15, 16 and 17 for carrying cooling water. Each section of the cooler has four strips 18, 19, 20 and 21 of anodised aluminium bolted together in pairs around pairs of the cooling water pipes. Preferably a high thermal conductivity gasket material (not shown) is applied to the mating faces so as to ensure good thermal contact between the copper cooling pipes and the aluminium strips. Spaced at intervals down the height of the cooler are a set of mounting brackets 23, of which only one is illustrated in the drawings. Each mounting bracket carries a hinge pin 22 to which the strips 19 and 20 are separately hinged so that, upon release of a set of clamps 24 (only one illustrated) strips 20 can be pivoted so as to allow strips 21 to be moved away from contact with strips 18 so as to open up the interior of the cooler. Being able to open up the interior of this cooler greatly facilitates the initial threading of the optical fibre through the cooler.

The interior of the cooler comprises an axial through-hole 25 opening abruptly into a succession of spherical chambers 26, the hole and the chambers being formed respectively by semicircular grooves 27, 28 and by hemispherical wells 29, 30 machined in the mating faces of strips 18 and 21. An abrupt opening of the through-hole 25 into the chambers 26 is desired in order to create turbulence in any flow of gas through the through-hole where that gas flow enters into a chamber. The chambers 26 are not necessarily spherical, but preferably have the shape of solids of revolution generated about an axis substantially coincident with the axis of the through hole 25 in order to facilitate cyclonic (swirling) gas flows within each chamber, and preferably that solid of revolution should be substantially smooth and cornerless in order to inhibit the possibility of the formation of dead spaces of substantially static gas in the cyclonic flow pattern. Cyclonic gas flow is promoted in the chambers 26 by means of gas injection or extraction via orifices 31, 32 which open substantially tangentially into the chambers. These orifices may be arranged so that orifices 31, through which the injection of gas induces cyclonic flow in one rotational sense, can communicate with alternate chambers 26; while orifices 32, through which the injection of gas induces cyclonic flow of the opposite rotational sense, communicate with the intervening chambers. Each orifice 31, 32 communicates at one end with a chamber 26, and communicates at the other end, via an O-ring seal 33, with an associated spigot 34 housed in strip 20.

In a specific example the through hole 25 had a diameter of 3 mm, and the chambers 26 were machined to a diameter of 14 mm at 15 mm centres.

It will be appreciated that the hinging of the strips 19 and 20 so as to allow the opening up of the interior of this cooler greatly facilitates the initial threading of an optical fibres through the cooler. Once this has been threaded, the clamps are replaced in their locked positions in which the mating faces of strips 18 and 21 are held together by pressure applied via resilient boots 35 on the clamps 24. A seal between the strips and 21 is provided by linear sealing strips 36 and 37 housed in channels formed respectively in strips 18 and 21.

Details of the connections of the spigot 34 to inlet or exhaust lines is not shown in FIGS. 2, 3 or 4. This is in part because such details may vary from example to example to suit specific circumstances. In one specific example helium gas from the gas cylinder 10 is applied to all spigots 34. For this purpose the connection is basically as schematically illustrated in FIG. 1 with the helium gas feed from cylinder 10 being connected to the top of a feed-line pipe 38 running the full height of the cooler from which individual spigots 34 are individually tee'd off. In practice, because of the relatively close spacing of the spigots 34, it may be found more convenient to have two feed lines extending in parallel the full height of the cooler, to tee off feeds to alternate spigots from one line, and to tee off feeds to the remaining spigots from the other line. This provides a greater vertical separation in which to accommodate adjacent tee-pieces in the two lines.

In the absence of a downward passage of the optical fibre 4 through the cooler, the natural buoyancy of helium would give rise to the situation where the majority of the injected helium would escape via the upper end of the through-hole 25. Normally however, given the small bore size of the through-hole 25, the line speed of the fibre at typical commercial line speeds of at least several tens of meters per minute creates a viscous drag in the downward direction greatly exceeding the effect of the natural buoyancy of the helium. Accordingly, unless steps are taken to prevent it, under these circumstances most of the injected helium will escape via the lower end of through-hole 25. In order to maximise cooling efficiency per unit consumption of coolant gas, it is generally useful to take steps to reduce the rate of gas escape from the bottom end of the cooler. One way of achieving this is to arrange for the injection rate of gas into the chambers 26 to be distributed unevenly between the chambers, with a greater gas flow rate into chambers nearer the top end than into those nearer the bottom end. This may be achieved by the use of independent metering, or by appropriate choice of the bore size of the pipework, constituted by the feed-line pipe 38, spigots 34, and orifices 31, 32, to provide a desired distribution of rheological impedance. A second way of restricting gas escape from the bottom end of the cooler is to provide some form of joining gaiter (not shown) to enclose in a substantially gas-tight manner the space between the lower end of the cooler 8 and the top of the coating applicator 6. This expedient has the effect of creating a net upward flow of coolant gas through the cooler, and hence in these circumstances it is preferable for the distribution of coolant gas injection to provide a greater gas flow rate into the chambers nearer the bottom end than into those nearer the top end. Achieving this by means of rheological impedance can be effected by supplying coolant gas from the cylinder 10 to the bottom end of feed-line pipe(s) 38 instead of to the top end. A third way is to insert a bush 39 (FIG. 3) into the through-hole at the bottom end of the cooler so as to throttle down the aperture at this point. A fourth way is to apply reduced pressure to one or more of the upper chambers to provide an extraction of gas instead of an injection. A fifth way is to replace the helium injection in the bottom one or more chambers 26 with an injection of a gas with larger molecules, such as nitrogen, which will act as a viscous plug inhibiting the downward passage of the helium injected above the plug. The prevention of, or at least reduction in the amount of, helium escaping from the lower end typically reduces the required consumption of helium. Additionally it provides an increased differential speed with respect to the fibre which tends to enhance the turbulence of the gas flow at the entry points to the chambers 26.

For a given material in the coating applicator 6, there is an upper limit to the temperature at which the fibre can enter the applicator without the coating quality, as for instance evidenced by bubble inclusion, the coating adhesion and the coating diameter being adversely affected to too great an extent. The fibre therefore has to be cooled, from the drawing temperature in the furnace 3, to beneath this upper limit temperature in the time taken for the flow to travel from the furnace to the applicator. This time depends upon the vertical separation between furnace and coating applicator, and upon draw speed. For a given cooling regime, a given fibre diameter, and a given vertical separation, the temperature of the fibre at entry into the coating applicator depends upon draw speed.

From measurements of fibre coating diameter as a function of draw speed, it has been found that up to a certain draw speed the coating diameter remains virtually constant, but that thereafter, further increases in draw speed produce a progressive reduction in coating diameter with a corresponding increase in the magnitude of diameter fluctuation. It is also found that the point at which mean coating diameter begins to fall away is also the point at which the above problems of coating adhesion and coating quality become manifest.

Figure 5:
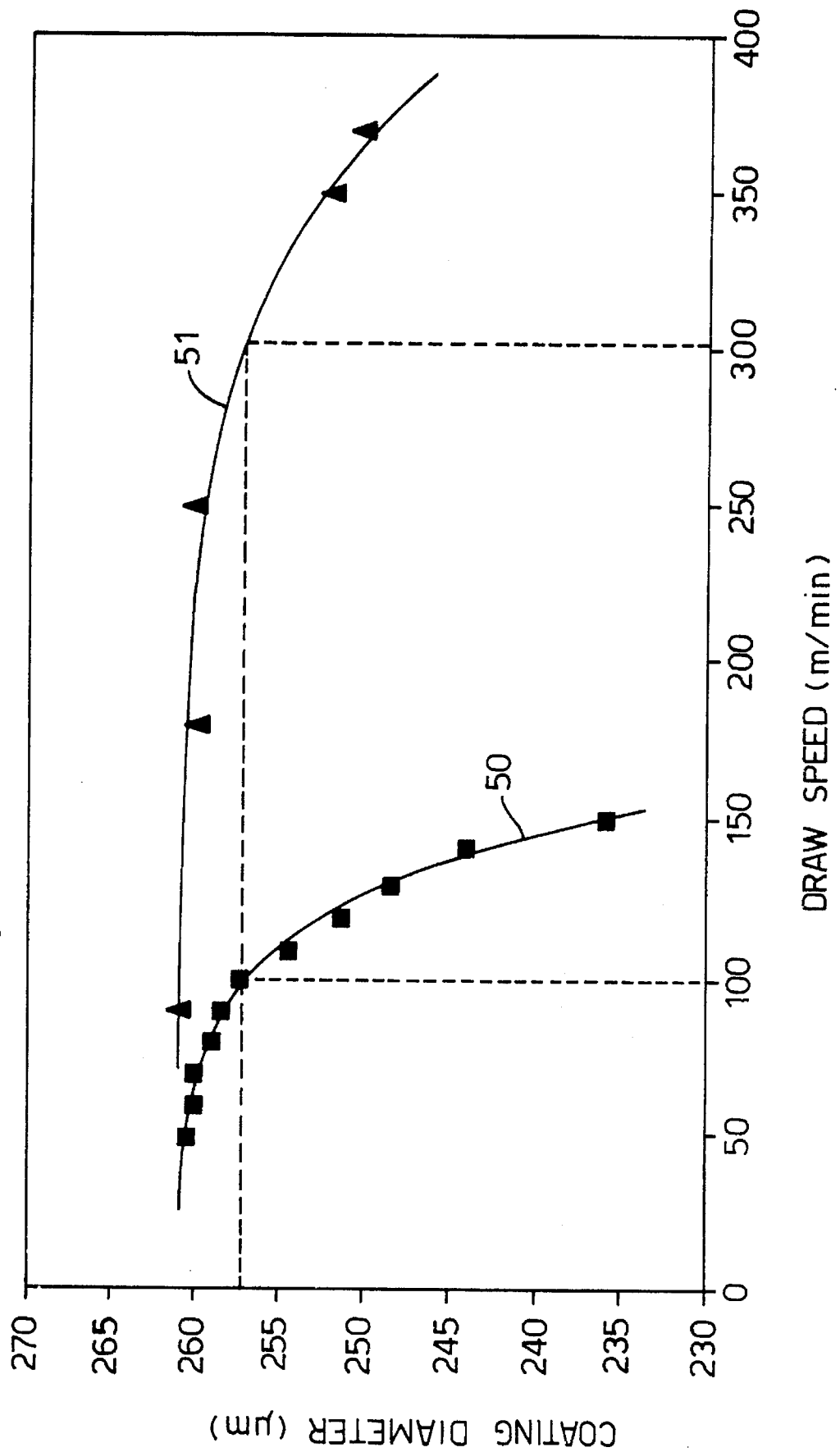
FIG. 5 is a graph contrasting the cooling of fibre obtained with and without the use of the cooler of FIGS. 1 to 4.

This progressive reduction in coating diameter with increasing draw speed is evident in FIG. 5 in which trace 50 depicts how the cladding diameter falls off with increasing draw speed in the case of 125 μm diameter fibre produced using a drawing tower with two meters vertical separation between furnace and coating applicator, and no intervening cooler. Trace 51 depicts the corresponding fall off in diameter with increasing draw speed that is provided when a two meter high cooler, as described above with reference to FIGS. 1 to 4 is inserted in the intervening space so as to leave 0.2 meters between the bottom end of the cooler and the top of the coating applicator. In this particular instance greater gas flow into chambers nearer the top end of the cooler than into those nearer the bottom end was achieved through the effects of rheological impedance in conjunction with a feed from the cylinder 10 to the top end of a pair of feedline pipes 38.

From a comparison of the two traces 50 and 51, it is seen that the use of the cooler raises the maximum satisfactory draw speed from about 100 meters per minute to about 300 meters per minute. It is also noteworthy that this three-fold increase is achieved with what may be considered to be a quite modest consumption of helium, namely one liter per minute.

I claim:
1. A method of cooling a filament, which method includes the step of passing the filament downwardly through an encircling refrigerated body member, in which body member the filament passes in succession through a series of chambers in each of which, by means of gas flow through a tangentially communicating orifice, a cyclonic flow of gas is maintained for the extraction of heat from the filament to the body member.

2. A method of cooling a filament which method is as claimed in claim 1, and wherein the cyclonic flow of gas within at least one of the set of chambers is of the opposite rotational sense to that of the cyclonic flow of gas within at least one other of the set of chambers.

3. A method as claimed in claim 2, wherein the cyclonic flow of gas within alternate chambers is of the same rotational sense.

4. A method as claimed in claim 2, wherein the filament is an optical fibre freshly drawn from optical fibre preform.

5. A method as claimed in claim 1, wherein an upward flow of helium is maintained in part of the body member by the introduction of helium into a plurality of the chambers of said series of chambers and by the extraction of helium from at least one chamber above said plurality of chambers.

6. A method as claimed in claim 5, wherein the flow of helium through the body member in the direction of axial extent of the fibre is predominantly in the upward direction.

7. A method as claimed in claim 6, wherein helium is introduced into selected ones of said series of chambers, and a downward flow of helium axially out of the bottom of the body member is inhibited by providing at least the lowest member of said series of chambers with a cyclonic flow of a gas whose molecules are larger than those of helium gas.

8. A method as claimed in claim 7, wherein the gas whose molecules are larger than those of helium gas is nitrogen.

9. A method as claimed in claim 1, wherein the filament is an optical fibre freshly drawn from optical fibre preform.

10. A method as claimed in claim 9, wherein an upward flow of helium is maintained in part of the body member by the introduction of helium into a plurality of the chambers of said series of chambers and by the extraction of helium from at least one chamber above said plurality of chambers.

11. A filament cooler having a body member provided with at least one passage for the through flow of refrigerant, the body member having an axial through-hole for the axial passage therethrough of a filament to be cooled, said hole opening within the body member abruptly into each of a succession of cyclonic flow chambers each provided with at least one associated tangential flow orifice communicating with gas flow ducting, said orifice being oriented with respect to its associated chamber such that flow of gas through the orifice excites cyclonic flow of gas within said associated chamber.

12. A filament cooler as claimed in claim 11, wherein each chamber has the shape of a substantially smooth cornerless solid of revolution having its axis substantially co-axially aligned with the axial through-hole.

13. A filament cooler as claimed in claim 12, wherein each chamber is substantially spherical.

14. A filament cooler having a body member provided with at least one passage for the through flow of refrigerant, the body member having an axial through-hole for the axial passage therethrough of a filament to be cooled, said hole opening within the body member abruptly into each of a succession of cyclonic flow chambers each provided with at least one associated tangential flow orifice communicating with gas flow ducting, said orifice being oriented with respect to its associated chamber such that flow of gas through the orifice excites cyclonic flow of gas within said associated chamber, wherein the orifices are interconnected with the ducting in a manner to provide at least one chamber with a cyclonic flow of one rotational sense, and to provide at least one chamber with a cyclonic flow of the opposite rotational sense.

15. A filament cooler as claimed in claim 14, wherein the orifices are interconnected with the ducting in a manner to provide alternate chambers with a cyclonic flow of the same rotational sense.

16. A filament cooler as claimed in claim 14, wherein the body member is formed with two hinged mating parts that join in a surface containing the axis of the through-hole.

17. A filament cooler as claimed in claim 14, wherein each chamber has the shape of a substantially smooth cornerless solid of revolution having its axis substantially co-axially aligned with the axial through-hole.

18. A filament cooler as claimed in claim 17, wherein the orifices are interconnected with the ducting in a manner to provide alternate chambers with a cyclonic flow of the same rotational sense.

19. A filament cooler as claimed in claim 18, wherein the body member is formed with two hinged mating parts that join in a surface containing the axis of the through-hole.

20. A filament cooler as claimed in claim 15, wherein the body member is formed with two hinged mating parts that join in a surface containing the axis of the through-hole.

* * * * *